United States Patent [19]
Palmer

[11] Patent Number: 5,661,942
[45] Date of Patent: Sep. 2, 1997

[54] MODULAR CONNECTOR SYSTEM FOR TUBULAR STRUCTURAL MEMBERS

[76] Inventor: Norwin Palmer, 5882 Tuttle Creek Blvd., Manhattan, Kans. 66502

[21] Appl. No.: 521,319

[22] Filed: Aug. 30, 1995

[51] Int. Cl.⁶ ..................................... E04H 12/10
[52] U.S. Cl. ..................... 52/653.2; 135/156; 403/96; 403/97
[58] Field of Search ................ 52/79.1, 653.2; 135/87, 156, 157, 158, 160, 114, 116, 120.3, 121; 403/91, 92, 44, 96, 97, 100, 101

[56] References Cited

U.S. PATENT DOCUMENTS

| | | | |
|---|---|---|---|
| 2,001,215 | 5/1935 | Ruppel | 52/653.2 |
| 2,621,689 | 12/1952 | Fordon | 403/92 X |
| 2,757,677 | 8/1956 | Denn | 135/160 |
| 3,055,380 | 8/1962 | Benka et al. | 135/120.3 X |
| 3,309,121 | 3/1967 | Fentiman | 403/91 X |
| 3,457,930 | 7/1969 | Gladden et al. | 135/156 |
| 3,586,355 | 6/1971 | Magi | 403/91 |
| 4,077,418 | 3/1978 | Cohen | 135/157 X |
| 4,505,609 | 3/1985 | Vella | 403/91 |
| 4,577,449 | 3/1986 | Celli . | |
| 4,666,328 | 5/1987 | Ryu | 403/92 |
| 4,704,836 | 11/1987 | Codd | 52/653.2 |
| 4,766,712 | 8/1988 | Hale | 52/653.2 X |
| 4,881,843 | 11/1989 | Randleman | 403/92 |
| 4,904,108 | 2/1990 | Wendel . | |
| 4,912,349 | 3/1990 | Chang | 403/91 X |
| 4,921,369 | 5/1990 | Chew, II et al. | 135/157 X |
| 5,031,371 | 7/1991 | Davister . | |
| 5,123,768 | 6/1992 | Franklin | 403/96 |
| 5,167,246 | 12/1992 | Mortenson | 135/160 X |
| 5,289,665 | 3/1994 | Higgins . | |
| 5,305,571 | 4/1994 | Trevino | 52/653.2 |
| 5,318,470 | 6/1994 | Denny . | |
| 5,396,915 | 3/1995 | Bomar | 403/97 X |

OTHER PUBLICATIONS

1994 Catalog, Outwater Plastics Industries pp. B-65, B-71, B-82, B-84 Through B-86, and B-94.

Primary Examiner—Wynn E. Wood
Assistant Examiner—Aimee E. McTigue
Attorney, Agent, or Firm—Simmons, Perrine, Albright & Ellwood, PLC

[57] ABSTRACT

A modular connector system for tubular structural members includes a variety of connector members, each having a connection wall for connection to a tubular structural member and a mating wall for connection to another connector member. The connection walls include cylindrical mounting collars and segments of cylinders. The mating walls include connector tabs and circular end walls. Each mating wall includes a peg disk relief, a fastener bore, and an array of peg recesses spaced about the bore. The connector members are secured together in sets of two, three, four, five or six by positioning a peg disk between the mating walls of the connector members to be connected together and passing a fastener through the connector members and the peg disk or disks. Each peg disk includes a peg disk plate having a fastener bore and an array of pegs spaced about the bore. The connector members are used to connect the tubular members to form various configurations of temporary shelter structures.

37 Claims, 6 Drawing Sheets

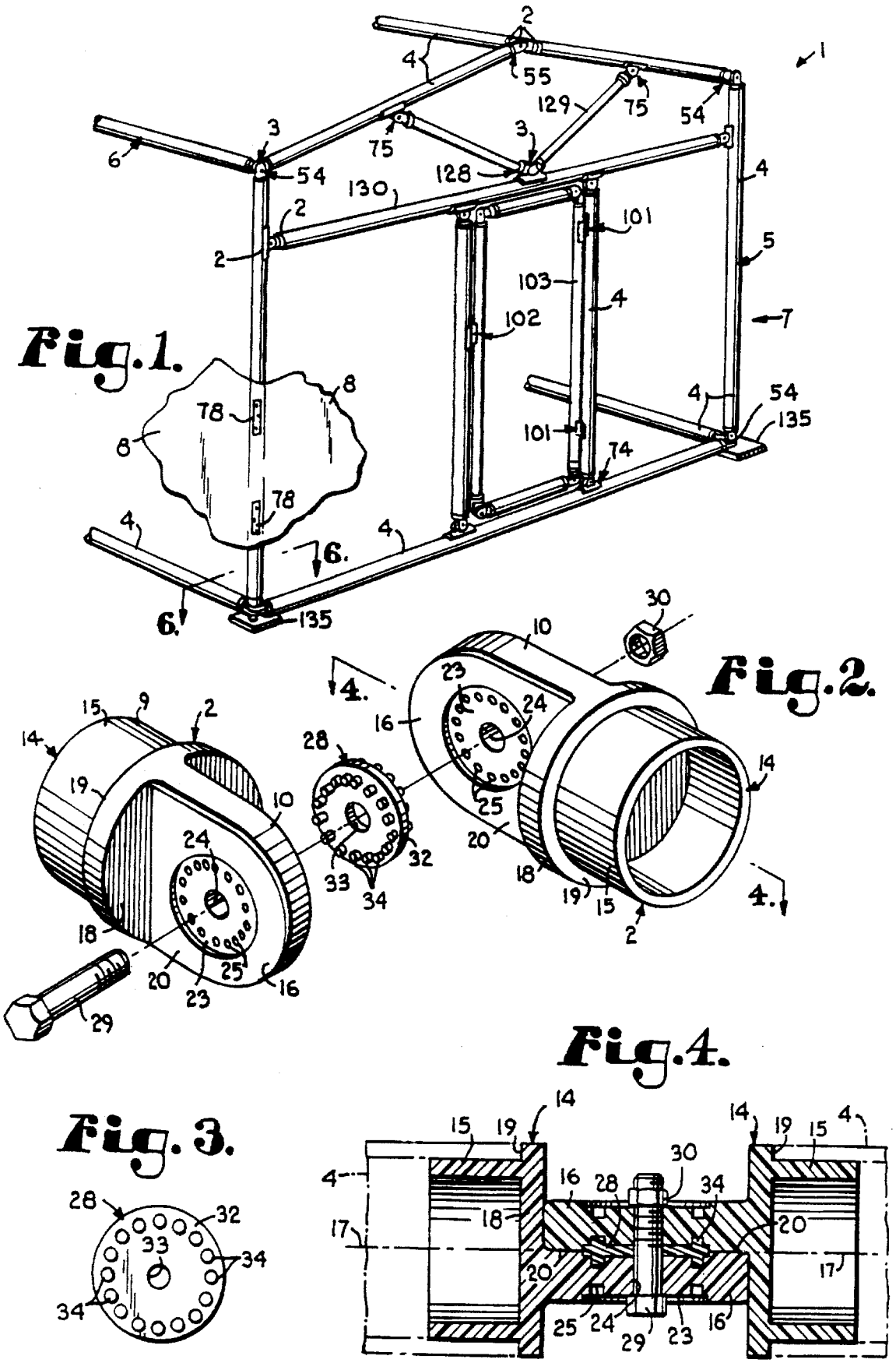

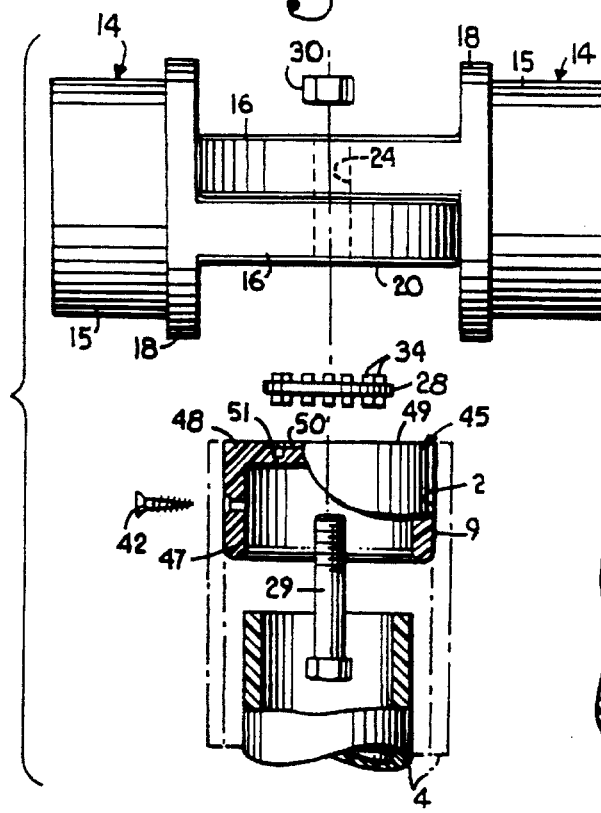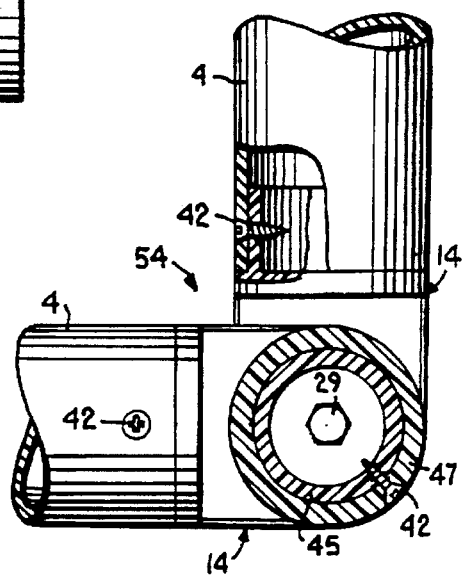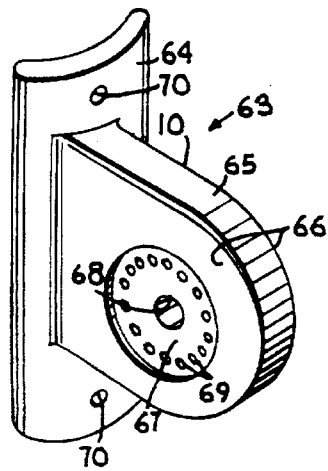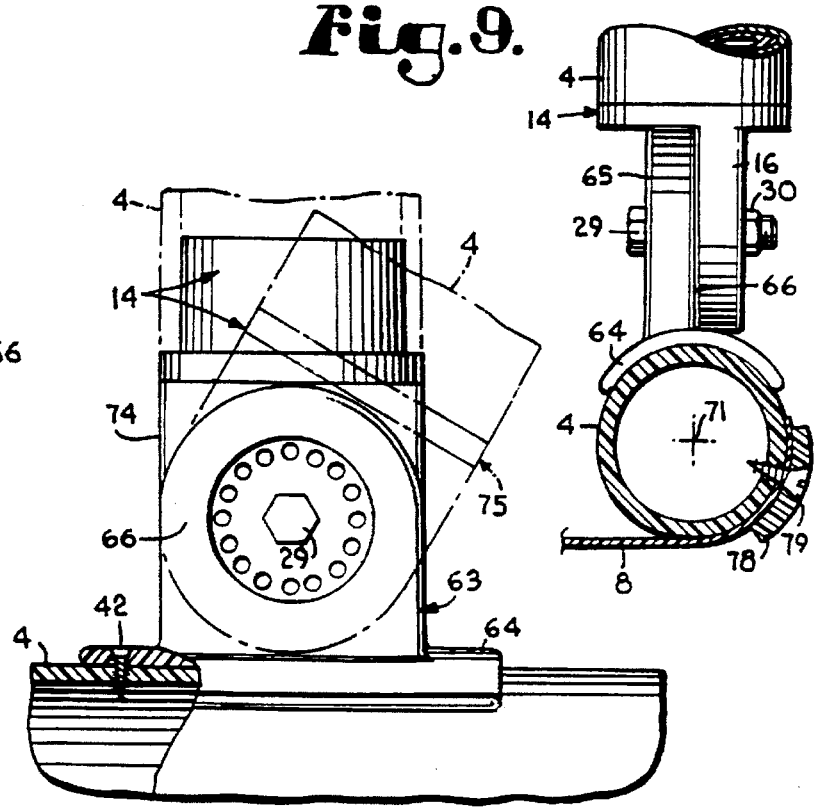

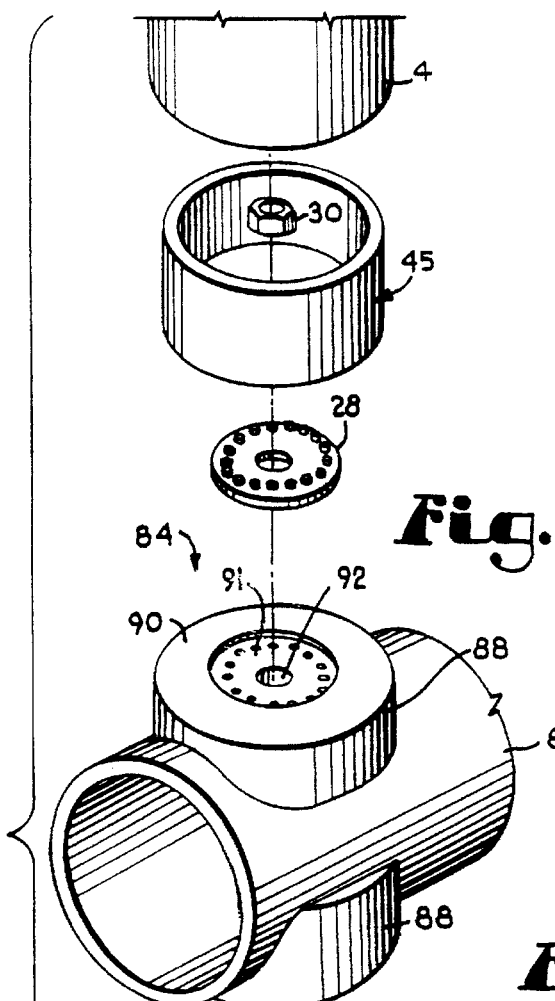
Fig.10.
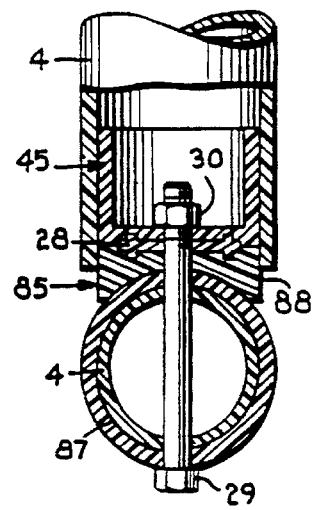
Fig.11.
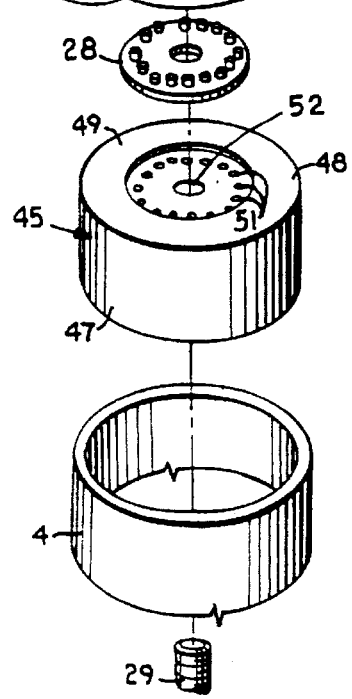
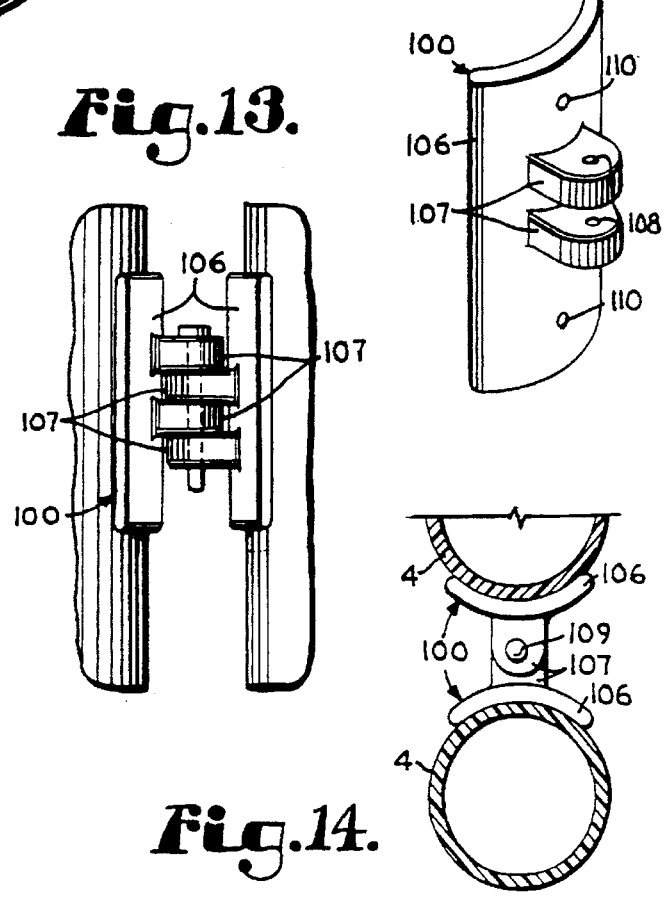
Fig.13.
Fig.12.
Fig.14.

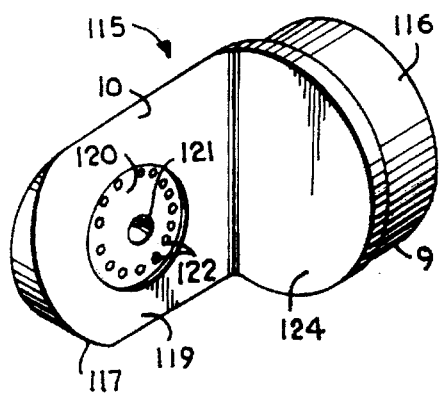
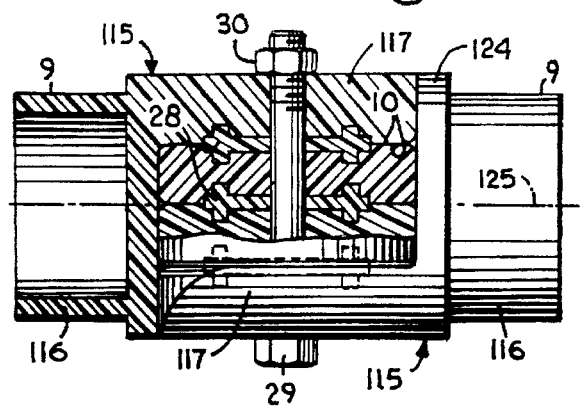
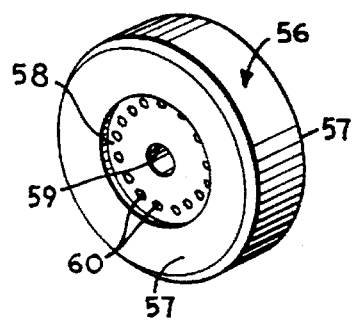
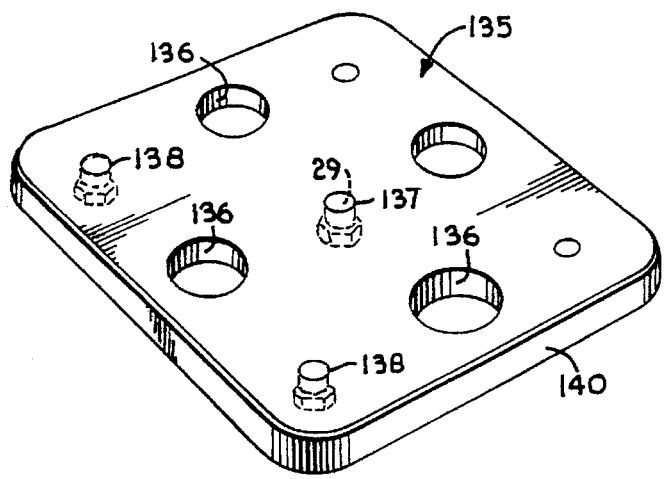
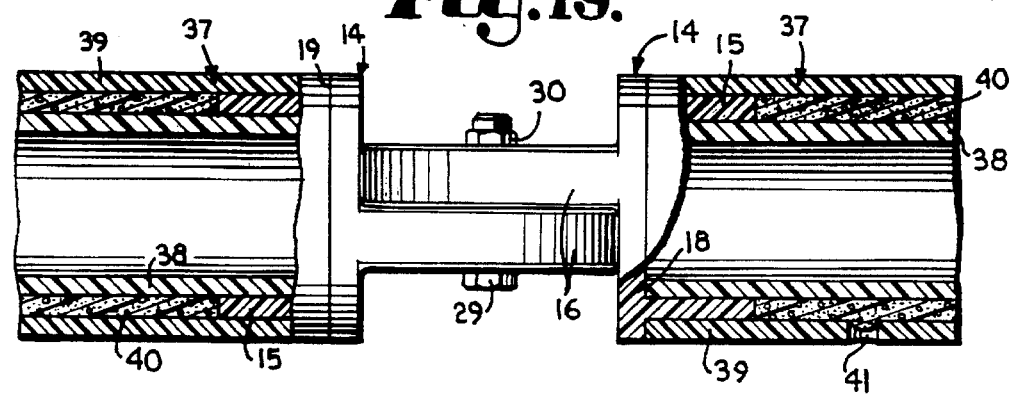

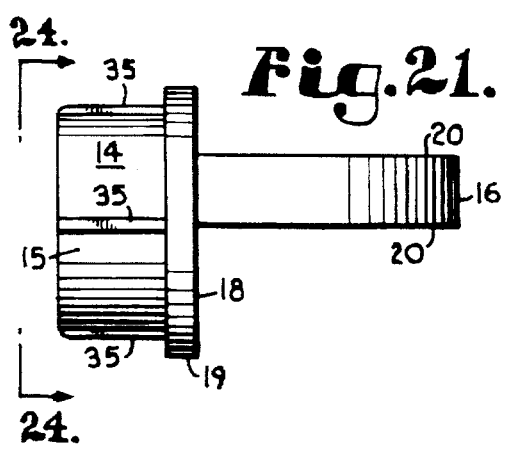
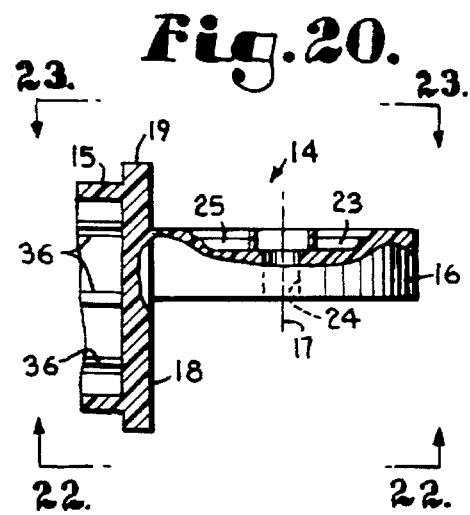
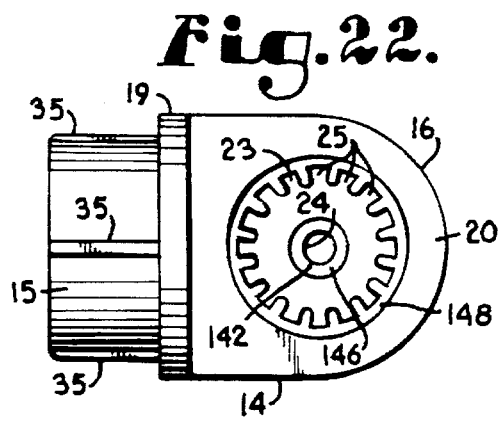
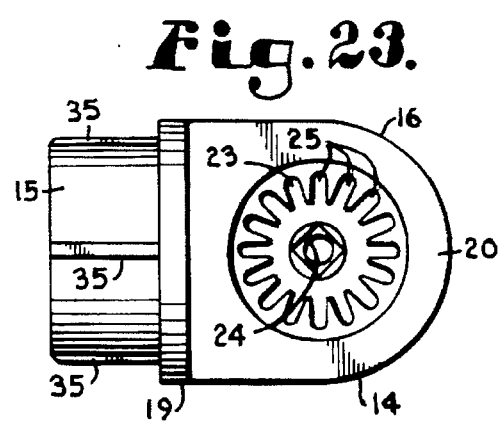
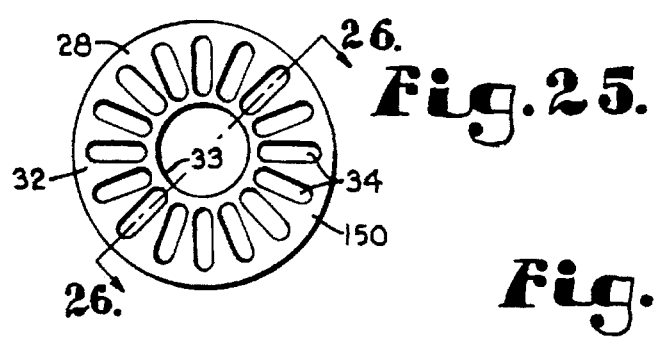
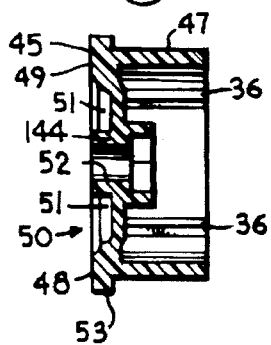
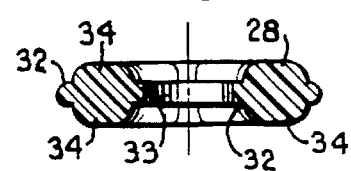
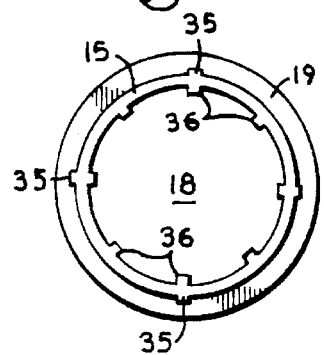

MODULAR CONNECTOR SYSTEM FOR TUBULAR STRUCTURAL MEMBERS

BACKGROUND OF THE INVENTION

Temporary shelter structures are useful for a number of varied purposes. During construction projects, such structures may be used for protecting building materials from the elements. Other uses include camping, picnics, carnivals, exhibitions, outdoor parties, weddings, funerals, and the like. Desirable characteristics of such temporary structures are ease of setup and takedown, lightweight and compact components, and sometimes modular configurations for variations of use. In some cases, shelter structures of this type may be setup for emergency use, such as those involving the Red Cross, military, disaster, etc., or for virtually permanent use, such as patio or beach umbrellas.

Temporary structures include various types of tents made of canvas or synthetic based fabrics with internal or external support which may include tubular aluminum poles, wooden poles, glass fiber rods, or the like. Other types of shelters include frames made of tubular steel, lumber, and other materials. With the great majority of types of temporary shelter structure designs, both the support framework members and covering materials are specially formed for assembly only in one specific configuration.

SUMMARY OF THE INVENTION

The present invention provides a modular connector system which enables the assembly of a wide variety of temporary shelter structures using common, generic structural members and covering materials. The connector system of the present invention provides components of joint assemblies which are adapted to interconnect lengths of inexpensive tubing, such as polyvinyl chloride (PVC) tubing, steel conduit (EMT), or aluminum conduit, as structural members. Roof and walls are then completed by overlaying with inexpensive plastic sheeting material. The connector system includes connector members which can form end-to-end connections of tubing in a variety of angular relationships, such as two-way, three-way, four-way, five-way and six-way joints for various type of corner joints, and tee-shaped joints for braces.

In general, each connector member includes a connection wall for connection to a tubular structural member and a mating wall for connection of one connector member to another connector member. Each mating wall includes a fastener aperture and a plurality of projection recesses spaced circumferentially and radially about the aperture. A mating wall of one connector member is secured to a mating wall of another connector by a common type of fastener, such as a bolt and nut set. Pivoting or rotation of one connector member relative to another is prevented by a projection plate or disk having a central fastener aperture and a ring of projections or pegs spaced about the aperture on both sides of the plate. The projection plate is positioned between the two mating walls with the projections received in the projection recesses of the mating walls. The pluralities of projections and projection recesses allow the joined tubular members to be secured and fixed in a variety of angular relationships. Preferably, projection plate reliefs are formed in the surfaces of the mating walls of a depth equal to half the thickness of the projection plate such that fading surfaces of the mating walls engage flushly when secured by the fastener.

The modular connection system of the present invention includes a number of embodiments of connector members. In the majority of embodiments, the connection wall is formed by a cylindrical mounting collar. In one connector member embodiment, the connection wall is formed by a chordal segment of a cylinder. Alternatively, other shapes of connection collars are contemplated, such as square or rectangular cross section or the like. The cylindrical collars are sized with an outer diameter to receive a standard size of PVC, EMT steel, or aluminum tube thereover and be secured by a fastener or adhesive. The collars are sized with an internal diameter to receive a smaller standard size PVC, EMT steel, or aluminum tube therein. A reinforced structural member may be assembled by using an inner and an outer tube in coaxial combination, with the annular space between the tubes optionally filled, as with a foam resin. When a stronger inner support is desired, a 1½" EMT steel conduit may be used. Also, a 1" or 1¼" EMT steel conduit may be used in combination with a bushing constructed of PVC or other suitable material.

In a preferred embodiment of the present invention, the connector members are formed of a tough and durable synthetic resin by molding. Alternatively, the connector members may be formed of metal, such as cast aluminum, iron, or steel alloys. PVC tubing is preferred for the structural members joined by the connector members of the present invention. However, metal tubing or lumber of rectangular, square, or round cross section, or other cross-sectional configuration, may also be employed.

The connector members of the present invention include configurations of tab connector members, offset tab connector members, cup connector members, tee-tab connector members, "multi"-way connector members, where "multi" may range from two to six.

The tab connector member, for up to a six-way configuration as herein described, is formed by a cylindrical mounting collar having a cylindrical axis, and end wall closing one end of the collar, and a connector tab forming the mating wall, and extending axially from the end wall. The connector tab has a fastener aperture formed therethrough. Opposite sides of the connector tab have a circular projection plate relief and a plurality of projection recesses spaced about the aperture. The connector tab may extend centrally along the cylindrical axis of the mounting collar. However, one surface of the connector tab is preferably substantially coplanar or flush with the cylindrical axis of the collar. The purpose for the off-center positioning of the connector tab is to position the axes of the collars of two joined tab connector members in the same plane so that the longitudinal axes of tubular members joined by the tab connector members are also coplanar. Such tab connector members may be referred to as flush offset tab connector members.

In a variation of the tab connector member, the offset tab connector member is formed in a manner similar to the tab connector member except that the connector tab is offset more widely from the cylindrical axis of the mounting collar. In order to align tubular members connected by a pair of offset tab connectors, one or more spacer disks are positioned between the connector tabs, depending on the mount of offset of the connector tabs. Each spacer disk has projection plate reliefs and rings of projection recesses on opposite sides thereof and a central fastener aperture. Alternatively, a spacer member could be replaced by the connector tab of a tab connector member, or a pair of spacer members could be replaced by a pair of flush offset tab connector members. Such configurations could result in a two-way, three-way, etc., joint assembly for a corresponding number of tubular members.

The cup connector member has a mounting collar forming the connection wall and an end wall forming the mating wall. The end wall closes one end of the mounting collar and has a projection plate relief, a ring of projection recesses, and a fastener aperture located centrally of the end wall. The cup connector member can be used with two, three or four tab connector members to form up to a six-way joint assembly.

The tee-tab connector member has an elongated chordal segment of a cylindrical wall forming the connection wall and a connector tab forming the mating wall. The connector tab extends parallel to a cylindrical axis of the cylindrical segment and outward from an outer surface of the connection wall. One surface of the connector tab is flush with a radial plane of the cylindrical segment which bisects the cylindrical segment. This configuration enables axes of tubular members connected by the tee-tab connector member and an offset tab connector member to be coplanar. The connector tab of the tee-tab connector member is similar to the connector tab of the tab connector member. The tee-tab connector member principally allows T-shaped and Y-shaped connections of one tubular member with another. In addition, a cup connector can be connected off either side, if desired.

The three-way connector member and four-way connector members are similar in configuration. The three-way connector member includes a short cylindrical connection tube forming the connection wall. The connection tube is the equivalent of a pair of aligned end-to-end connection collars which can receive a pair of tubular structural members within or over its opposite ends. A mating wall for the three-way connector member is formed by an end wall of a tubular boss which intersects the connection tube perpendicular to a cylindrical axis of the connection tube. The end wall has a projection plate relief, a ring of projection recesses, and a fastener aperture formed therein.

The three-way connector member may form an aligned T-shaped joint assembly between a pair of end-to-end tubular members and a third tubular member using a cup connector member. Alternatively, a tab connector member or an offset tab connector member can be used to form an offset T-shaped joint assembly or a nonperpendicular Y-shaped joint assembly. The four-way connector member is similar to the three-way connector member except for the inclusion of a second tubular boss with a second mating wall. The second tubular boss may be aligned with the first tubular boss on the opposite side of the connection tube or may be oriented at another angle about the connection tube with respect to the first tubular boss.

Using combinations of the connector members of the present invention, tubular members may be joined to form wall frames. The wall frames may be joined by additional connector members and tubular members to form a three dimensional shelter frame. Such a shelter frame may have a flat roof, a single pitched roof, or a peaked roof. Additional tubular members and connector members may be used to form braces, doors, windows, and the like. The roof and sides of the shelter frame may be closed by sheeting, such as plastic film or sheets of rigid plastic, corrugated fiberglass, steel, aluminum or plywood, which are attached to the tubular members forming the various wall panels.

OBJECTS AND ADVANTAGES OF THE INVENTION

The principal objects of the present invention are: to provide an improved type of temporary shelter structure; to provide such a structure which employs inexpensive, generic structural members and covering materials; to provide such a structure which makes use of polyvinyl chloride (PVC), steel (EMT) or aluminum tubing for structural members and plastic film or sheeting constructed of rigid plastic, fiberglass, steel, aluminum, plywood, or the like, for covering materials; to provide a modular connection system for interconnecting such structural members to form a framework for such a temporary shelter structure; to provide such a modular connection system including a variety of configurations of connector members which can be assembled in various combinations to form two-way, three-way, four-way, five-way, six-way, T-shaped, and Y-shaped joint assemblies for interconnecting the structural members in a variety of mutual orientations; to provide such a modular connection system in which each of the connector members includes a connection wall for connection to a tubular structural member and a mating wall for connection to the mating wall of another connector member; to provide such a modular connection system in which the connection walls are formed by cylindrical collars or chordal segments of cylinders; to provide such a system in which each of the mating walls includes a fastener aperture, a circular relief about the aperture, and a circular array of projection recesses; to provide such a system including a projection with a circular array of projections about a central fastener aperture on opposite sides of a plate; to provide such a system in which a projection plate is positioned between two mating walls with the projections received in the projection recesses of the two mating walls to prevent relative pivoting or rotation of the connector members; to provide such a system in which two or more connector members are secured together in a selected mutual orientation by a common type of fastener, such as a bolt and nut set; to provide such a system including a tab connector member including a cylindrical mounting collar with a connector member extending axially of the collar, the connector tab having projection plate reliefs and circular arrays of projection recesses on both sides of the tab about a fastener aperture; to provide such a tab connector member in which the connector tab is flushly offset from the collar axis whereby longitudinal axes of a pair of tubular structural members connected by such connector members are coplanar; to provide such a system including a cup connector member including a mounting collar and an end wall closing one end of the collar and having a projection plate relief, an array of projection recesses, and a fastener aperture; to provide such a system in which a cup connector member can be connected to a pair of tab connector members to connect three tubular structural members in a mutually perpendicular relationship to form a three-way corner joint; to provide such a system in which the mounting collars have an inner diameter to receive a standard size of PVC, EMT steel or aluminum tube therein and an Outer diameter to receive a larger standard size of PVC, EMT steel or aluminum tube thereover; to provide such a system in which a coaxial set of an inner and an outer tubular members are connected to such a mounting collar and the annular space between the tubular members may be optionally filled with a reinforcing material, such as a foam resin injected therein; to provide such a system including a tee-tab connector member including an elongated chordal segment of a cylinder with a connector tab extending therefrom for connection of an end of one tubular member to a middle region of another tubular member in a T-shaped or Y-shaped orientation; to provide such a system including three-way, four-way, etc., connector members formed by a cylindrical connector tube having one or more tubular bosses intersecting the connection tube, each of the tubular bosses having a mating wall closing its outer end; to provide such a modular connection system in which the connector members can be adapted for use with elongated structural members having cross sections other than circular tubes; and to provide such a modular connection system for connecting tubular members to form a temporary shelter structure which is economical to manufacture, which is convenient to assemble and durable in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of a tubular frame for a temporary shelter structure which incorporates a modular connection system embodying the present invention.

FIG. 2 is an enlarged exploded perspective view of a pair of tab connector members of the modular connection system of the present invention.

FIG. 3 is an elevational view of a projection plate or disk employed to fix the angular relationship of tubular members connected by the modular connection system.

FIG. 4 is a fragmentary sectional view taken on line 4—4 of FIG. 2 and illustrates assembly details of a pair of the tab connector members of the modular connection system.

FIG. 5 is a partially exploded elevational view of a three-way joint assembly employing a pair of the tab connector members and a cup connector member of the modular connection system, with portions cut away to reveal details thereof.

FIG. 6 is an enlarged fragmentary transverse sectional view taken on line 6—6 of FIG. 1 and illustrates the three-way joint assembly as used in the temporary shelter structure of the modular connection system.

FIG. 7 is a perspective view of a tee-tab connector member of the modular connection system for making a T-shaped connection of one tubular member to another.

FIG. 8 is an enlarged fragmentary side elevational view of a tee-joint assembly employing a tab connector member and a tee-tab connector member of the modular connection system, with portions cut away to reveal details thereof.

FIG. 9 is an end elevational view at a reduced scale of the tee-joint assembly of the modular connection system.

FIG. 10 is an exploded perspective view of a four-way joint assembly according to the modular connection system of the present invention.

FIG. 11 is a cross sectional view at a reduced scale of a three-way joint assembly with portions cut away to reveal details thereof, according to the modular connection system of the present invention.

FIG. 12 is a perspective view of a hinge member of the present invention for use with the tubular members forming the temporary shelter structure.

FIG. 13 is a fragmentary sectional view at a reduced scale of a hinge assembly formed by a pair of the hinge members shown connected by a hinge pin of the modular connection system.

FIG. 14 is a fragmentary end view of the hinge assembly illustrated in FIG. 13, according to the present invention.

FIG. 15 is a perspective view of a modified tab connector member of the modular connection system of the present invention having a connector tab which is substantially offset from the axis of a mounting collar of the connector member.

FIG. 16 is a side elevational view, partially in section, illustrating a pair of the offset tab connector members forming a joint assembly with a pair of spacer members therebetween.

FIG. 17 is a perspective view of a spacer member of the modular connection system of the present invention.

FIG. 18 is a foot plate of the present invention for supporting a vertical member of the temporary shelter structure.

FIG. 19 is a fragmentary elevational view of a tab joint assembly formed by a pair of the tab connector members and illustrates a reinforced tubular structural member in which the annular space between a pair of coaxial tubular members is filled with a foam resin.

FIG. 20 is an edge elevational view of the tab connector member of the modular connection system, showing internal ribs or risers thereof.

FIG. 21 is a fragmentary, edge elevational view of the tab connector member of the modular connection system, with portions cut away to reveal details thereof and showing externals or risers thereof.

FIG. 22 is a side elevational view of the tab connector member of the modular connection system showing an alternative disk relief.

FIG. 23 is a side elevational view of the tab connector member of the modular connection system showing yet another alternative disk relief.

FIG. 24 is an end elevational view of the tab connector member of the modular connection system, showing both the internal and the external ribs or risers thereof.

FIG. 25 is an enlarged elevational view of the projection plate or disk of the modular connection system, similar to that shown in FIG. 3 but having projections adapted to mate with either the disk relief shown in FIG. 22 or the disk relief shown in FIG. 23.

FIG. 26 is a cross-sectional view of the projection plate or disk of the modular connection system taken along line 26—26 of FIG. 25.

FIG. 27 is a cross-sectional view of a cup connector member of the modular connection system, similar to that shown in FIG. 5 but having a lip.

DETAILED DESCRIPTION OF THE INVENTION

Figure 28:
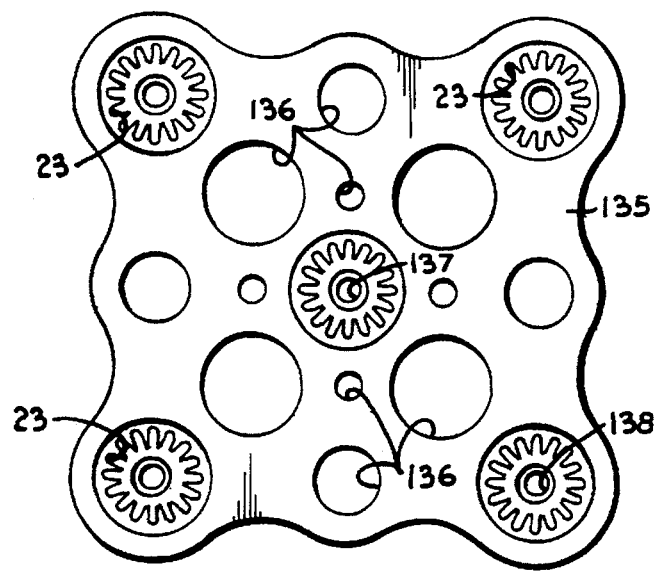
FIG. 28 is a top view of an alternative foot plate of the modular connection system, showing disk relief therein.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a modular connector system which embodies the present invention. The system 1 includes a variety of configurations of connector members 2 having common characteristics which may be assembled in a variety of joint assemblies 3 to interconnect tubular structural members 4 to form a framework 5 of a temporary shelter structure 6. The joined tubular members 4 form wall panels or subframes 7 which are closed by sheeting material 8, such as plastic film or sheeting constructed of rigid plastic, corrugated fiberglass, steel, aluminum, plywood, or other suitable material. Each of the connector members 2 includes a connection wall 9 for connection of a tubular structural member 4 thereto and a mating wall 10 for connection to the mating wall 10 of another connector member 4.

FIGS. 2, 4, 5, and 20–23 illustrate a tab connector member 14. The tab connector member 14 includes a mounting collar 15 forming the connection wall 9 and a connector tab 16 forming a mating wall 10. The mounting collar 15 is generally cylindrical and has a cylindrical axis 17 (FIG. 4) extending therethrough. An end wall 18 closes one end of the mounting collar 15 and has the connector tab 16 extending therefrom in an axial direction of the mounting collar 15. The end wall 18 forms a shoulder 19 with the mounting collar 15. The connector tab 16 is rounded at its outer end and has opposite mating surfaces 20. Each mating surface 20 has a circular projection plate relief or peg disk relief 23 formed therein. A fastener aperture or bore 24 is formed through the tab 16 at the center of the relief 23, and a circular array of projection recesses or peg recesses 25 are formed into the tab 16 within the relief 23 about the bore 24.

Two or more connector members 14 may be used to connect the ends of tubular structural members 4 at a single joint assembly 3, in a variety of angular relationships using one or more projection plates or peg disks 28 and a fastener, such as a bolt 29 and nut 30 or other suitable fastener. The illustrated peg disk 28 includes a circular peg disk wall 32 having a central fastener aperture 33 and a plurality of projections or pegs 34 spaced radially and circumferentially about the aperture 33 on opposite sides of the peg disk wall 32. The projection pegs 34 are illustrated as cylindrical pegs; however, the projections 34 could alternatively be of another shape, such as segments of disks or rectangular projections or the like arrayed radially or in another suitable configuration about the aperture 33.

An alternative design for the projection plate 28 is illustrated in FIGS. 25 and 26, where the projections 34 are "hot-dog" shaped, which are adapted to mate with either of the alternative designs for the disk relief 23 shown in FIGS. 22 and 23. It is to be understood that one of the mating surfaces 20 of a selected one of the connector members 2 may have one of the designs for the disk relief 23 shown in FIGS. 22 and 23 while another of the mating surfaces 20 of that same connector member 2 may have the same design, the other design shown in FIGS. 22 and 23 for the disk relief 23, or yet another suitable design for the disk relief 23, as desired.

The illustrated peg disk 28 has its projections 34 aligned on opposite sides of the plate 32. The projections 34 could alternatively be offset circumferentially on opposite sides of the plate 32 on some peg disks 28 to increase the variety of angles at which the tab connector members 14 are connected. The projections 34 are positioned in the peg recesses 25 when the tab connector members 14 are secured together by the bolt 29 and nut 30. Although not illustrated, washers and lock washers may be used with the bolt 29 and nut 30 to distribute the compression force of the head of the bolt 29 and nut 30 to prevent the bolt 29 and nut 30 from loosening. Alternatively, square, hexagonal (as indicated in FIGS. 18 and 23) or other non-circular receivers may be provided; for example, to prevent rotation of the head of a carriage bolt contained therein.

Referring to FIG. 4, each of the peg disk reliefs 23 are sized to receive a peg disk 28 halfway therein. By this arrangement, the mating surfaces 20 of the connector tabs 16 of a pair of tab connector members 14 are mutually engaging. The connector tabs 16 could extend centrally from the end wall 18, centered on the collar axis 17. However, it is preferred that, for some applications, the tabs 16 be offset from such a central location relative to the axis 17 so that one mating surface 20 of each tab 16 has the associated collar axis 17 lying in its plane. Such a tab connector member 14 with one mating surface 20 flush with the collar axis 17 may be referred to herein as a flush offset tab connector member. The purpose for this configuration is to position longitudinal axes of the tubular members 4 connected to the connector members 14 in a common plane. For other applications, the tabs 16 of some of the connector members 14 may be offset by the thickness of the tab 16 from the axis 17 as herein described.

The illustrated tubular structural members 4 are generally standard "Schedule 40" polyvinyl chloride (PVC), steel conduit (EMT), or aluminum conduit tubing and have nominal diameters of 2 inches or 1.5 inches. The mounting collars 15 of the tab connector members 14, and of other connector members 2 of the system 1, are sized with an outer diameter to receive the 2-inch members 4 thereover and an inner diameter to receive a 1.5-inch EMT conduit member therein.

If desired, the mounting collar 15 of one of the connector members 2 may include a plurality of external ribs or risers 35, as illustrated in FIGS. 21–24, to allow for inconsistent inside diameters of PVC tubing. Since the inside diameter of EMT steel conduit and aluminum conduit is slightly larger than the inside diameter of PVC tubing of the same nominal size, the external ribs 35 are dimensioned such that EMT steel conduit and aluminum conduit readily fit over the ribs 35 while PVC tubing will usually slightly deform in order to slide over the ribs 35. Although four of the ribs 35 are shown on the mounting collar 15 in the Figures, it is to be understood that a different number, or none, of the ribs 35 may be appropriate for some applications.

In addition, the mounting collar 15 may include a plurality of internal ribs or risers 36, as illustrated in FIGS. 20, 24 and 27. Again, although six of the ribs 36 are indicated in FIG. 27 and eight of the ribs 36 are indicated in FIGS. 20 and 24, it is to be understood that a different number, or none, of the ribs 36 may be appropriate for some applications.

Referring to FIG. 19, a reinforced structural member 37 may be build up using an inner tube 38 inserted into the mounting collar 15 and butted against the end wall 18 and an outer tube 39 sleeved over the collar 15 and engaging the shoulder 19. An annular space between the tubes 38 and 39 is then optionally filled, such as with a foam resin 40 which is injected through a port 41 in the outer tube 39, and allowed to cure. Alternatively, if the inner tube will not be permanently connected to the outer tube, a bushing (not shown) may be placed between the inner surface of the outer tube and the outer surface of the inner tube.

The tab connector members 14 are preferably formed of a molded synthetic resin which is strong and durable, such as ABS or the like. Alternatively, the members 14 may be cast from metal such as aluminum, brass, steel, iron, or other suitable alloys or materials. The peg disks 28 may be formed of similar materials. The tubular members 4 may be secured to the mounting collars 15 by an adhesive or cement, by self-tapping screws 42 (FIG. 5), or by external clamps (not shown) similar to hose clamps.

FIGS. 5, 6, 10 and 11 illustrate a cup connector embodiment 45 of the connector member 2 of the system 1. The cup connector member 45 has a mounting collar 47 forming the connection wall 9 and an end wall 48 forming the mating wall 10. The end wall 48 closes one end of the mounting collar 47 and has an outer mating surface 49 having a peg disk relief 50, peg recesses 51, and a fastener aperture 52 (FIG. 10) formed in the mating surface 49. The cup connector 45, as shown in FIG. 10, is adapted to mate with the projection plate 28 as shown in FIG. 10. An alternative design for the cup connector member 45 having a lip 53 is shown in FIG. 27 and is adapted to mate with the projection plate 28 as shown in FIGS. 25 and 26. An advantage provided by the lip 53 is that one of the cup connector member 45 with the lip 53 can be connected in a back-to-back relation with another one of the cup connector members 45, either with or without the lip 53, to serve as a union fitting for connecting two tubular structural members 4 in an end-to-end relation without such a union protruding beyond the periphery of the two tubular structural members 4. The lip 45 on one or both of the cup connector members 45 prevents the cup connector members 45 from inadvertently slipping into the interior of the tubular structural members 4.

The cup connector members 45 can be used in combination with a pair of tab connector members 14 to form a three-way corner joint assembly 54 in which two tubular members 4 connected by tab connector members 14 lie in a common plane, and a third tubular member 4 connected by a cup connector member 45 is perpendicular to the plane of the first two members 4. Such corner joint assemblies 54 may be used to form upper and lower corner joint assemblies of the shelter framework 5 (FIG. 1). Additionally, the members 4 connected by the tab connector members 14 may be oriented at an acute angle or an obtuse angle, such as in the roof peak joint assembly 55 shown in FIG. 1.

Referring to FIG. 5, the mounting collar of the cup connector 45 has an inner diameter to receive a 1.5-inch diameter EMT tubular member 4 therein and an outer diameter to receive a 2-inch diameter member 4 thereover. When the larger tubular member 4 is employed, there may not be enough space between the end walls 18 of the connected tab connector members 14 to clear the wall thickness of the larger tubular member 4, depending on the distance of the apertures 24 from their respective end walls 18. To accommodate use of the larger diameter tubular member 4, a spacer disk 56 and an additional peg disk 28 may be positioned between the facing mating surfaces 20 and 49 of the tab connector member 14 and the cup connector member 45. Referring to FIG. 17, the spacer disk 56 may have a diameter equal to the width and the same thickness of one of the connector tabs 16 of a tab connector member 14. The spacer disk 56 has opposite mating surfaces 57, each having a peg disk relief 58, a fastener aperture 59, and a circular or other suitable array of peg recesses 60.

FIGS. 7–9 illustrate a tee-tab connector embodiment 63 of the connector member 2 of the system 1. The tee-tab connector member 63 has a connection wall 9 in the form of an elongated chordal segment 64 of a cylinder and a mating wall 10 in the form of a connector tab 65 extending from an outer surface of the connector wall 64. The connector tab 65 has opposite mating surfaces 66, each having a peg disk relief 67, a fastener bore 68, and a circular or other suitable array of peg recesses 69. The connection wall 64 may have pilot holes 70 formed therein to receive fasteners, such as self-tapping screws 42, to secure the connection wall 64 to the outer surface of a tubular member 4.

The connector tab 65 is oriented with its mating surfaces 66 parallel to a cylindrical axis 71 (FIG. 9) of the connection wall 64, at least one of which may extend radially therefrom. It is preferred that the connector tab 65 be offset from radial orientation so that a plane longitudinally bisecting the connection wall 64 and passing through the axis 71 is coplanar with one mating surface 66 of the tab 65. As illustrated in FIG. 9, this arrangement aligns a tubular member 4 connected to the tee-tab connector member 63 with a tubular member 4 connected to a tab connector member 14. The tee-tab connector member 63 may be connected to tab connector members 14 and other embodiments of the connector members 2 of the system 1. The tee-tab connector member 63 may be used to form a T-shaped joint assembly 74 if the tubular members 4 connected thereby are perpendicular, or a Y-shaped joint assembly 75 if the tubular members 4 are nonperpendicular. The joint assemblies 74 and 75 are illustrated in use on the shelter framework 5 in FIG. 1. Also, one or two cup connectors 45 could be attached to the connector tab 65, with or without use of the spacer 56 as herein described.

FIG. 9 illustrates an arrangement for securing flexible sheeting material 8 to a tubular member 4. As shown, the material 8 is wrapped partially about the tubular member 4 and secured using a sheet clamp member 78 and a plurality of fasteners 79. The sheet clamp member 78 is an elongated chordal segment of a cylinder, and the fasteners 79 may be self-tapping screws, similar to the screws 42. Alternatively, other means may be used for securing the material 8 to the tubular members 4, such as staples, various kinds of adhesive tapes, U-bolts, or other suitable devices.

FIGS. 10 and 11 illustrate a four-way connector member 84 and a three-way connector member 85, respectively. The connector members 84 and 85 are similar in configuration. The four-way connector member 84 includes a cylindrical connection tube 87 forming a connection wall 9 and a pair of cylindrical bosses 88 positioned on the connection tube 87 and forming mating walls 10. Each boss 88 has an outwardly facing mating surface 90 with a peg disk relief 91, a fastener bore 92, and a circular or other suitable array of peg recesses 93. The connection tube 87 receives a pair of tubular members 4 from opposite ends. Each boss 88 may have a tubular member 4 connected thereto using a cup connector member 45 and a peg disk 28. The three-way connector member 85 is similar to the four-way connector member 84, but with only one cylindrical boss 88.

FIGS. 12–14 illustrate a double tab connector member 100 which is useful in the system 1 for connecting tubular members 4 in side-by-side parallel relation in the shelter framework 5. Such connections may form hinge joint assemblies 101 or latch joint assemblies 102 (FIG. 1), as for a door frame 103 of the shelter structure 6. Each connector member 100 includes a connection wall 106 formed by an elongated chordal segment of a cylinder and a pair of spaced apart and aligned connector tabs 107. The connector tabs 107 extend outwardly from the connection wall 106 and have aligned pin apertures 108 formed therethrough to receive a hinge or latch pin 109. The connection wall 106 may include pilot holes 110 to receive fasteners, such as self-tapping screws 42 or the like, to attach the connection wall 106 to the outer surface of a tubular member 4.

The sets of connector tabs 107 on separate connector members 100 may be fit within one another and a pin 109 received through the aligned apertures 108 to form a pivot for hinge joint 101. If multiple connection members 100 are positioned on each of a pair of tubular members intended to be connected in a hinge relationship, the pin apertures 108 must be aligned on each tubular member 4 to form a common hinge axis. The connection members 100 may also be used as a latch for the door frame 103 by using a pin 109 which is relatively easy to grasp and insert and remove. Alternatively and particularly when the tab connector members 100 are used as a latch, the apertures 108 may be elongated slots, preferably with their major axes oriented generally perpendicularly to the connection wall 106.

FIGS. 15 and 16 illustrate an offset tab connector member 115. The offset tab connector member 115 includes a mounting collar 116 and a connector tab 117 forming respectively the connection wall 9 arid mating wall 10. The tab 117 includes a mating surface 119 having a peg disk relief 120, a fastener bore 121, and a circular or other suitable array of peg recesses 122. As illustrated, the connector tab 117 extends from an end wall 124 closing one end of the mounting collar 116, at a position which is substantially offset from a cylindrical axis 125 of the collar 116. For example, the mating surface 119 is spaced from the axis of the mounting collar 116 such that as the mating surface 20 of the connector tab 16 (see FIG. 2) is placed in abutting engagement with the mating surface 119, the opposite mating surface of that connector tab 116 lies substantially along the axis of the mounting collar 116.

In order to connect a pair of tubular members 4 in alignment, a pair of the spacer disks 56 (FIG. 17) are positioned, along with three peg disks 28, between the facing mating surfaces 119 of the tabs 117. Because of the offset spacing of the tabs 117, either or both of the spacer disks 56 may be replaced with a connector tab 16 of a tab connector member 14 or a connector tab 66 of a tee-tab connector member 63. The combination of an offset tab connector member 115, a tab connector member 14, and a tee-tab connector member 63 can be assembled to form a K-shaped joint assembly 128 to connect a pair of brace members 129 to a cross member 130 of the shelter structure 6 shown in FIG. 1.

If desired, the boss 88 may be used to convert an arcuate surface to a planar surface, such as installing the boss 88 to the connector tab 117 (see FIG. 16) by the bolt and nut 29 and 30. One of the cup connector members 45 may then be connected to the boss 88 as herein described whereby a tubular structural member 4 may be connected upwardly (from the offset tab connector member 115 as shown in FIG. 16). Further, one of the bosses 88 may be installed at each opposing end of the bolt and nut set 29 and 30 whereby one of the members 4 can be connected upwardly and the other one of the members 4 connected downwardly, relative to the orientation shown in FIG. 16.

FIG. 18 illustrates a foot plate member 135 which is used with the shelter framework 5 to anchor and/or to distribute the weight of the shelter structure 6 on a support surface, such as the ground. The foot plate may be used with several of the joint assemblies 3 of the system 1, such as the three-way corner joint assembly 54 in which the securing bolt 29 is also passed through an aperture (not shown) in the foot plate 135. The illustrated foot plate 135 may be provided with an assortment of stake bores 136 to receive differently sized stakes (not shown) to positively anchor the shelter structure 6 to the ground. It should be noted that connector members 2 may be installed either at a center orifice 137 or an off-center orifice 138 of the foot plate member 135, as desired.

Figure 29:
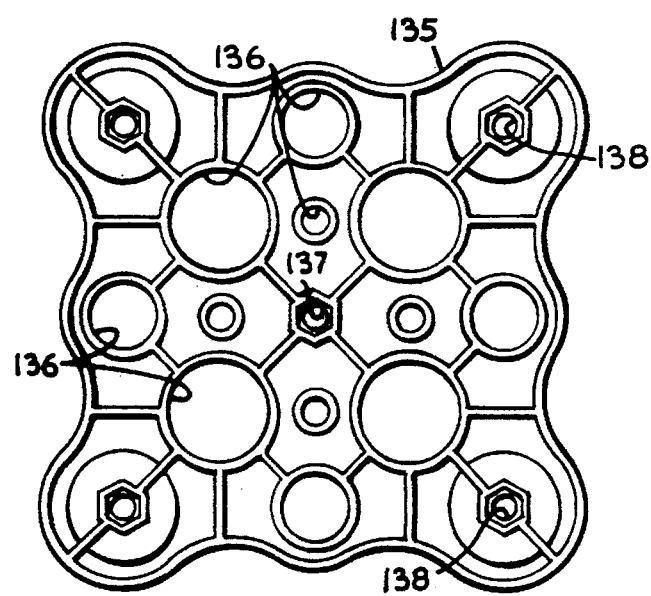
FIG. 29 is a bottom view of the foot plate of the modular connection system shown in FIG. 28, showing optional blocked out portions thereof to reduce the amount of material therein while maintaining the structural integrity thereof, according to the present invention.

An alternative design for the foot plate member 135 is shown in FIGS. 28 and 29. An advantage of the latter foot plate member 135 is that a pair of the tab connector members 14 can be attached at one of the off-center orifices 138 and be angularly spaced relative to each other at an obtuse angle if desired, for example, up to 135°, whereas the foot plate member 135 shown in FIG. 18 would only permit the two tab connector members to be spaced up to approximately 90° relative to each other before being limited by abutment of the shoulders 19 of the two tab connector members 14 with an edge 140 of the foot plate member 135.

It is to be understood that the foot plate members 135 may be solid or may have portions thereof blocked out to reduce the material therein, such as suggested in FIG. 29, so long as the structural integrity thereof is maintained. The same saving of material also applies to the connector tabs 16, etc., of the various connector members 2 where appropriate. Where two or more of the connector members 2 are to be tightened against each other, such as with the bolt and nut 29 and 30, it is advisable to utilize internal structural support, such as that indicated by the numerals 142 and 144 in FIGS. 22 and 27, respectively. For example, surface 146 of the structural support 142, as shown in FIG. 22, is substantially co-planar with surface 148 of the relief 23 such that both of the surfaces 146 and 148 bear against surface 150 of one of the disk plates 32 placed thereagainst.

The modular connector system 1 provides apparatus for connecting the tubular members 4 in a variety of configurations to form a variety of shapes of temporary shelter structures 6, such as a rectangular framework, a lean-to shaped shelter with a single pitched roof panel 7, or a peaked roof shelter structure 6, as shown in FIG. 1. The modular connector system 1 may also be used to construct structures other than the temporary shelter structures 6 disclosed and illustrated. Such other uses of the system 1 are intended to be encompassed by the present invention. It is to be understood that while certain forms of the present invention have been illustrated and described herein, it is not to be limited to the specific forms or arrangement of parts described and shown.

What is claimed and desired to be secured by Letters Patent is as follows:

1. A modular connection assembly for connecting first and second elongated structural members at a selected mutual orientation, said assembly comprising:

(a) a first connector member having a first connection wall and a generally planar first mating wall with a first aperture formed therethrough and a first recess formed thereinto, said first connection wall enabling connection of a first elongated structural member thereto;

(b) a second connector member having a second connection wall and a generally planar second mating wall with a second aperture formed therethrough and a second recess formed thereinto, said second connection wall enabling connection of a second elongated structural member thereto;

(c) a projection plate having a plate aperture formed therethrough, generally planar opposite sides, and first and second projections respectively from said opposite sides;

(d) said first and said second connection members being positioned with said plate therebetween and said first and second projections positioned respectively in said first and second recesses and said first, second, and plate apertures aligned; and (e) a fastener extending through said first, second, and plate apertures to secure said first and second connector members and elongated structural members connected thereto in said selected mutual orientation.

2. An assembly as set forth in claim 1 wherein at least one of said connector members includes:

(a) said connection wall including a cylindrical mounting collar with a cylindrical axis; and (b) said mating wall including a connection tab extending in an axial direction from said mounting collar.

3. An assembly as set forth in claim 2 wherein:

(a) said connection tab has opposite mating surfaces; and (b) each of said mating surfaces has a projection receiving recess formed thereinto.

4. An assembly as set forth in claim 1 wherein at least one of said connector members includes:

(a) said connection wall including a cylindrical mounting collar with a cylindrical axis; and (b) said mating wall including an end wall oriented perpendicular to said cylindrical axis.

5. An assembly as set forth in claim 1 wherein at least one of said connector members includes:

(a) said connection wall including a segment of a cylindrical wall having a cylindrical axis and an outer cylindrical surface; and (b) said mating wall including a connection tab extending from said outer cylindrical surface, said tab being oriented substantially parallel to said cylindrical axis.

6. An assembly as set forth in claim 5 wherein said one of said connection members is said first connection member, said connection tab is a first connection tab, and said cylindrical axis is a first cylindrical axis, and said second connection member includes:

(a) said second connection wall including a second cylindrical mounting collar with a second cylindrical axis; and (b) said second mating wall including a second connection tab extending in an axial direction from said second mounting collar.

7. An assembly as set forth in claim 6 wherein:

(a) said first connection tab and said second connection tab are each offset from the associated cylindrical axis in such a manner that when said connection tabs are secured by said fastener, the associated cylindrical axes are substantially coplanar.

8. An assembly as set forth in claim 1 wherein at least one of said connector members includes:

(a) said connection wall including a pair of cylindrical mounting collars interconnected, oriented, and aligned to receive a pair of elongated members from mutually opposite directions.

9. An assembly as set forth in claim 1 wherein:

(a) said projection plate includes a plurality of projections positioned radially about said plate aperture on each of said opposite sides of said plate.

10. An assembly as set forth in claim 9 wherein:

(a) corresponding projections on opposite sides of said plate are mutually aligned.

11. An assembly as set forth in claim 1 wherein:

(a) said projection plate is disk shaped.

12. An assembly as set forth in claim 1 wherein:

(a) at least one of said connection members includes a plurality of recesses formed into the associated mating wall, said recesses being positioned radially about the associated aperture thereof.

13. An assembly as set forth in claim 1 wherein at least one of said connection members includes:

(a) a projection plate recess formed into the associated mating wall, said plate recess being sized and shaped and having such a depth as to receive said projection plate at least partially therein.

14. An assembly as set forth in claim 13 wherein:

(a) said plate recess has a depth to receive approximately half a thickness of said projection plate therein.

15. An assembly as set forth in claim 1 wherein at least one of said connection members includes:

(a) said connection wall including a mounting collar; and (b) said collar having an inner diameter to receive therein a cylindrical, elongated structural member having a selected outer diameter.

16. An assembly as set forth in claim 1 wherein at least one of said connection members includes:

(a) said connection wall includes a mounting collar; and (b) said collar having an outer diameter to be received in a cylindrical, elongated, tubular structural member having a selected inner diameter.

17. An assembly as set forth in claim 1 wherein at least one of said connection members includes:

(a) said connection wall including a mounting collar;

(b) said collar having an inner diameter to receive therein a cylindrical, elongated structural member having a selected outer diameter; and (c) said collar having an outer diameter to be received in a cylindrical, elongated, tubular structural member having a selected inner diameter.

18. A modular connection assembly for connecting a pair of elongated tubular members at a selected angle, said assembly comprising:

(a) a pair of end connector members, each connector member including a cylindrical mounting collar with a cylindrical axis and a connection tab extending axially from the associated mounting collar, each collar being adapted to connect with a respective elongated member;

(b) each connection tab having generally planar opposite surfaces, a fastener aperture formed therethrough, and a projection recess formed into each of said opposite surfaces;

(c) a projection plate having a respective projection extending from generally planar opposite sides thereof and a plate aperture;

(d) said connection tabs being positioned with said projection plate therebetween and said projection positioned in said projection recess of facing surfaces of said tabs, and said fastener and plate apertures aligned; and (e) a fastener extending through the aligned fastener and plate apertures to secure said end connector members and tubular members connected thereto at said selected angle.

19. An assembly as set forth in claim 18 wherein:

(a) each connection tab is offset from the associated cylinder axis in such a manner that when said connection tabs are secured by said fastener, the cylindrical axes of the associated collars are positioned substantially in a single plane.

20. An assembly as set forth in claim 18 and including:
(a) each connection tab being offset from the associated cylinder axis;
(b) a spacer member having opposite sides, a spacer projection recess formed into each side, and a central aperture;
(c) a second projection plate having a respective projection extending from opposite sides thereof and a second plate aperture;
(d) said spacer member being positioned between the first named projection plate and said second projection plate, and said connector tabs being positioned outward of the first projection plate and said second projection plate wherein said connector tabs may be selectively angled relative to each other by rotating one or both of the end connector members relative to the spacer member during assembly; and
(e) said fastener extending through said apertures of said connector tabs, said projection plates, and said spacer member and securing same together.

21. An assembly as set forth in claim 18 and including:
(a) a cup connector member adapted for connecting a third elongated tubular member to said pair of elongated tubular members by way of said pair of connector members, said cap connector member including:
(1) a cylindrical cup mounting collar having a cup cylindrical axis; and
(2) an end wall extending across one end of said cup mounting collar, said end wall having a centrally located fastener aperture formed therethrough and a cup projection recess formed thereinto;
(b) a second projection plate having a second projection extending from each of opposite sides thereof and a second plate aperture formed therethrough;
(c) said cup connector member being positioned adjacent one of said connector tabs with said second projection plate therebetween, with said second projections being positioned respectively in a projection recess of said one connector tab and said end wall, and with said fastener aperture aligned with said apertures of said connector tabs; and
(d) said fastener extending through said connector tab apertures and said fastener aperture of said cup connector member to thereby secure said end connector members and said cup connector member together.

22. An assembly as set forth in claim 18 wherein:
(a) said projection plate includes a plurality of projections positioned radially about said plate aperture on each of said opposite sides of said plate.

23. An assembly as set forth in claim 22 wherein:
(a) corresponding projections on opposite sides of said plate are mutually aligned.

24. An assembly as set forth in claim 18 wherein:
(a) said projection plate is disk shaped.

25. An assembly as set forth in claim 18 wherein:
(a) at least one of said connector members includes a plurality of projection recesses formed into the connector tab, said recesses being positioned radially about the associated aperture thereof.

26. An assembly as set forth in claim 18 wherein at least one of said connector members includes:
a projection plate recess formed into the associated connector tab, said plate recess being sized and shaped and having such a depth as to receive said projection plate at least partially therein.

27. An assembly as set forth in claim 26 wherein:
(a) said plate recess has a depth to receive approximately half a thickness of said projection plate therein.

28. An assembly as set forth in claim 18 wherein at least one of said connector members includes:
(a) said mounting collar having an inner diameter to receive therein an elongated tubular member having a selected outer diameter.

29. An assembly as set forth in claim 18 wherein at least one of said connector members includes:
(a) said mounting collar having an outer diameter to be received in an elongated tubular member having a selected inner diameter.

30. An assembly as set forth in claim 18 wherein at least one of said connector members includes:
(a) said mounting collar having an inner diameter to receive therein an elongated tubular member having a selected outer diameter; and
(b) said mounting collar having an outer diameter to be received in an elongated tubular member having a selected inner diameter.

31. A temporary shelter structure comprising:
(a) a plurality of elongated structural members;
(b) said elongated structural members being connected by a plurality of joint assemblies to define respective wall frames;
(c) said wall frames being connected by said joint assemblies and additional elongated structural members to define additional wall frames and overall defining a three dimensional shelter skeleton; and
(d) each joint assembly including at least:
(1) a first connector member having a first connection wall and a generally planar first mating wall with a first aperture formed therethrough and a first recess formed thereinto, said first connection wall enabling connection of a first elongated structural member thereto;
(2) a second connector member having a second connection wall and a generally planar second mating wall with a second aperture formed therethrough and a second recess formed thereinto, said second connection wall enabling connection of a second elongated structural member thereto;
(3) a projection plate having a plate aperture formed therethrough, generally planar opposite sides, and first and second projections respectively from said opposite sides;
(4) said first and said second connection members being positioned with said plate therebetween and said first and second projections positioned respectively in said first and second recesses and said first, second, and plate apertures aligned; and
(5) a fastener extending through said first, second, and plate apertures to secure said first and second connector members and elongated structural members connected thereto in a selected mutual orientation.

32. A structure as set forth in claim 31 and including:
(a) selected ones of said wall frames being closed by respective sheets connected to the elongated structural members defining said ones of said wall frames.

33. An assembly its set forth in claim 31 wherein at least one of said connector members includes:
(a) said connection wall including a cylindrical mounting collar with a cylindrical axis; and
(b) said mating wall including an end wall oriented perpendicular to said cylindrical axis.

34. An assembly as set forth in claim 31 wherein at least one of said connector members includes:

(a) said connection wall including a segment of a cylindrical wall having a cylindrical axis and an outer cylindrical surface; and (b) said mating wall including a connection tab extending from said outer cylindrical surface, said tab being oriented substantially parallel to said cylindrical axis.

35. An assembly as set forth in claim 31 wherein at least one of said connector members includes:

(a) said connection wall including a cylindrical mounting collar with a cylindrical axis; and (b) said mating wall including a connection tab extending in an axial direction from said mounting collar.

36. An assembly as set forth in claim 35 wherein said one of said connection members is said first connection member, said connection tab is a first connection tab, and said cylindrical axis is a first cylindrical axis, and said second connection member includes:

(a) said second connection wall including a second cylindrical mounting collar with a second cylindrical axis; and (b) said second mating wall including a second connection tab extending in an axial direction from said second mounting collar.

37. An assembly as set forth in claim 36 and including:

(a) a cup connection member adapted for connecting a third elongated structural member to pair of elongated structural members connected by way of said first connection member and said second connection member, said cup connection member including:

(1) a cylindrical cup mounting collar having a cup cylindrical axis; and (2) an end wall extending across one end of said cup mounting collar, said end wall having a centrally located fastener aperture formed therethrough and a cup projection recess formed thereinto;

(b) a second projection plate having a second projection extending from each of opposite sides thereof and a second plate aperture formed therethrough;

(c) said cup connection member being positioned adjacent one of said connection tabs with said second projection plate therebetween, with said second projections being positioned respectively in a projection recess of said one connection tab and said end wall, and with said fastener aperture aligned with said apertures of said connection tabs; and (d) said fastener extending through said connection tab apertures and said fastener aperture of said cup connection member to thereby secure said first and second connection members and said cup connection member together.

\* \* \* \* \*

UNITED STATES PATENT AND TRADEMARK OFFICE
CERTIFICATE OF CORRECTION

PATENT NO. : 5,661,942
DATED : September 2, 1997
INVENTOR(S) : Norwin Palmer

It is certified that error appears in the above-identified patent and that said Letters Patent is hereby corrected as shown below:

Column 1, line 63, delete "fading" and insert therefor --facing--. Column 2, line 56, delete "mount" and insert therefor --amount--. Column 6, line 29, delete "externals" and insert therefor --external ribs--. Column 6, line 53, delete "relief" and insert --reliefs--.

Signed and Sealed this

Nineteenth Day of May, 1998

Attest:

BRUCE LEHMAN

Attesting Officer

Commissioner of Patents and Trademarks